US008826901B2

(12) United States Patent
Haydock et al.

(10) Patent No.: US 8,826,901 B2
(45) Date of Patent: Sep. 9, 2014

(54) PRIMARY HEAT EXCHANGER DESIGN FOR CONDENSING GAS FURNACE

(75) Inventors: Paul M. Haydock, Zionsville, IN (US); Nitu Gupta, Westfield, IN (US)

(73) Assignee: Carrier Corporation, Farmington, CT (US)

( * ) Notice: Subject to any disclaimer, the term of this patent is extended or adjusted under 35 U.S.C. 154(b) by 847 days.

(21) Appl. No.: 13/010,284

(22) Filed: Jan. 20, 2011

(65) Prior Publication Data

US 2011/0174301 A1 Jul. 21, 2011

Related U.S. Application Data

(60) Provisional application No. 61/296,505, filed on Jan. 20, 2010.

(51) Int. Cl.
| | |
|---|---|
| F24H 3/06 | (2006.01) |
| F24H 3/10 | (2006.01) |
| F28D 1/03 | (2006.01) |
| F24H 8/00 | (2006.01) |
| F23J 15/06 | (2006.01) |

(52) U.S. Cl.
CPC .............. *F28D 1/035* (2013.01); *Y02B 30/102* (2013.01); *F24H 3/105* (2013.01); *F24H 8/00* (2013.01); *F23J 15/06* (2013.01); *Y02E 20/346* (2013.01); *Y02E 20/363* (2013.01)
USPC .................. 126/99 R; 126/99 C; 126/110 R; 165/168; 165/170

(58) Field of Classification Search
CPC ....... F24H 3/105; F28D 1/035; F28D 1/0308; F28D 1/0316; F28D 21/0008; F28D 9/0025; F28D 9/0031; F28D 3/02; F28D 3/025
USPC ............ 126/99 C, 99 R, 110 R; 165/168, 170
See application file for complete search history.

(56) References Cited

U.S. PATENT DOCUMENTS

| | | | | |
|---|---|---|---|---|
| 1,927,174 | A | * | 9/1933 | Jones ......................... 126/116 R |
| 2,121,108 | A | * | 6/1938 | Tuck ............................ 126/99 R |
| 2,181,927 | A | * | 12/1939 | Townsend ..................... 165/147 |
| 2,864,588 | A | * | 12/1958 | Booth et al. ................... 165/133 |
| 3,016,946 | A | * | 1/1962 | Ticknor ........................ 126/85 R |
| 3,291,206 | A | * | 12/1966 | Nicholson ...................... 165/166 |
| 3,294,082 | A | | 12/1966 | Norris |
| 3,502,142 | A | * | 3/1970 | McGuffey ..................... 165/170 |
| 3,783,090 | A | * | 1/1974 | Andersson ..................... 165/166 |
| 3,807,382 | A | | 4/1974 | Kennedy |
| 4,080,181 | A | | 3/1978 | Feistel et al. |
| 4,141,412 | A | * | 2/1979 | Culbertson .................... 165/166 |

(Continued)

FOREIGN PATENT DOCUMENTS

GB 1339542 A * 12/1973

*Primary Examiner* — Jorge Pereiro
(74) *Attorney, Agent, or Firm* — Miller, Matthias & Hull LLP

(57) ABSTRACT

A compact furnace heat exchanger for a gas furnace is disclosed. The compact furnace heat exchanger may include a first pass having an inlet end, a second pass in fluid communication with the first pass through a first return bend, and a third pass having an outlet end and in fluid communication with the second pass through a second return bend. The third pass may further include a plurality of irregularities for optimizing performance of the compact furnace heat exchanger and the associated gas furnace.

20 Claims, 7 Drawing Sheets

(56) References Cited

U.S. PATENT DOCUMENTS

| | | | |
|---|---|---|---|
| 4,301,864 A * | 11/1981 | Kivikas et al. | 165/167 |
| 4,434,643 A * | 3/1984 | Almqvist et al. | 72/379.6 |
| 4,735,609 A * | 4/1988 | Comeau et al. | 604/114 |
| 5,094,224 A * | 3/1992 | Diesch | 126/110 R |
| 5,174,370 A * | 12/1992 | Hallgren | 165/166 |
| 5,226,474 A * | 7/1993 | Hallgren | 165/110 |
| 5,254,259 A * | 10/1993 | Bellhouse et al. | 210/650 |
| 5,271,376 A * | 12/1993 | Lu et al. | 126/110 R |
| 5,309,890 A * | 5/1994 | Rieke et al. | 126/110 R |
| 5,320,087 A | 6/1994 | Froman | |
| 5,346,001 A | 9/1994 | Rieke et al. | |
| 5,379,749 A * | 1/1995 | Rieke et al. | 126/110 R |
| 5,417,199 A * | 5/1995 | Jamieson et al. | 126/110 AA |
| D360,258 S | 7/1995 | Shellenberger | |
| 5,439,050 A * | 8/1995 | Waterman et al. | 165/170 |
| 5,525,311 A * | 6/1996 | Girod et al. | 422/200 |
| 5,540,899 A * | 7/1996 | Koves | 422/200 |
| 5,762,887 A * | 6/1998 | Girod et al. | 422/200 |
| 6,109,254 A | 8/2000 | Reinke et al. | |
| RE37,009 E * | 1/2001 | Diesch | 126/391.1 |
| 6,394,176 B1 | 5/2002 | Marsais | |
| 6,401,804 B1 * | 6/2002 | Shimoya et al. | 165/70 |
| 6,422,306 B1 | 7/2002 | Tomlinson et al. | |
| 6,470,878 B1 * | 10/2002 | Brown et al. | 126/110 R |
| 6,484,798 B1 * | 11/2002 | Manohar et al. | 165/170 |
| 6,536,231 B2 | 3/2003 | Gupte | |
| 6,596,244 B1 * | 7/2003 | Pujado | 422/198 |
| 6,793,015 B1 | 9/2004 | Brown et al. | |
| 6,799,630 B1 * | 10/2004 | Kato et al. | 165/177 |
| 6,851,469 B2 * | 2/2005 | Sears et al. | 165/170 |
| 6,889,686 B2 * | 5/2005 | Specht | 126/110 R |
| 6,938,688 B2 | 9/2005 | Lengauer, Jr. et al. | |
| 7,025,127 B2 * | 4/2006 | Wu et al. | 165/170 |
| 7,096,933 B1 | 8/2006 | Zia et al. | |
| 7,334,631 B2 * | 2/2008 | Kato et al. | 165/166 |
| 7,337,837 B2 | 3/2008 | Edwards | |
| 8,561,601 B2 * | 10/2013 | Schneberger et al. | 126/99 R |
| 2002/0040777 A1 * | 4/2002 | Tomlinson et al. | 165/163 |
| 2003/0127087 A1 | 7/2003 | Hill et al. | 126/99 R |
| 2004/0069474 A1 | 4/2004 | Wu et al. | 165/170 |
| 2004/0104015 A1 | 6/2004 | O'Donnell et al. | 165/109.1 |
| 2005/0016719 A1 * | 1/2005 | Blomgren et al. | 165/165 |
| 2005/0252644 A1 | 11/2005 | Hofmann | 165/109.1 |
| 2006/0237178 A1 | 10/2006 | Katoh et al. | 165/153 |
| 2008/0296005 A1 | 12/2008 | Taras et al. | |
| 2010/0173255 A1 * | 7/2010 | Reifel et al. | 431/350 |
| 2011/0139419 A1 * | 6/2011 | Blomgren et al. | 165/170 |
| 2011/0174290 A1 * | 7/2011 | Schneberger et al. | 126/110 R |
| 2011/0174291 A1 * | 7/2011 | Manohar et al. | 126/112 |
| 2011/0277974 A1 * | 11/2011 | Haydock et al. | 165/170 |

* cited by examiner

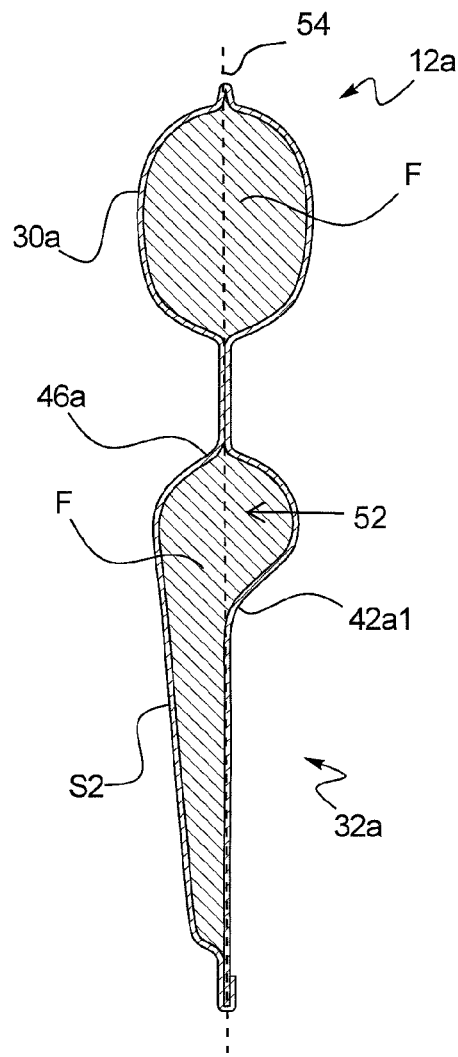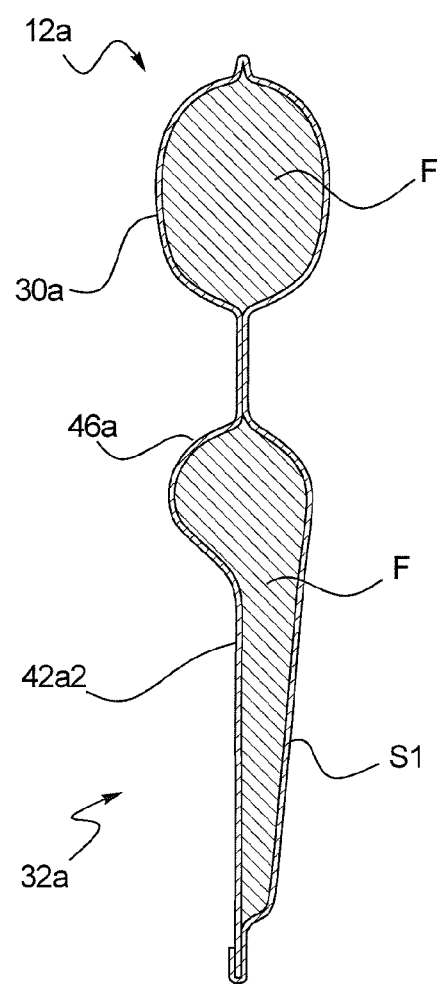

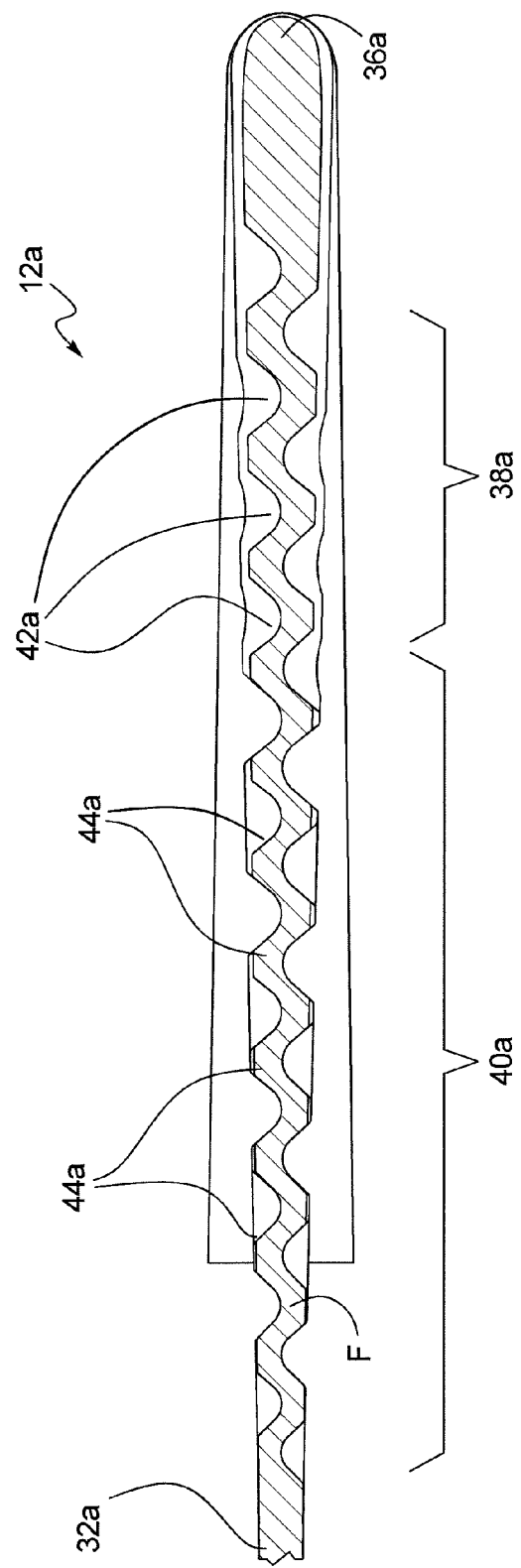

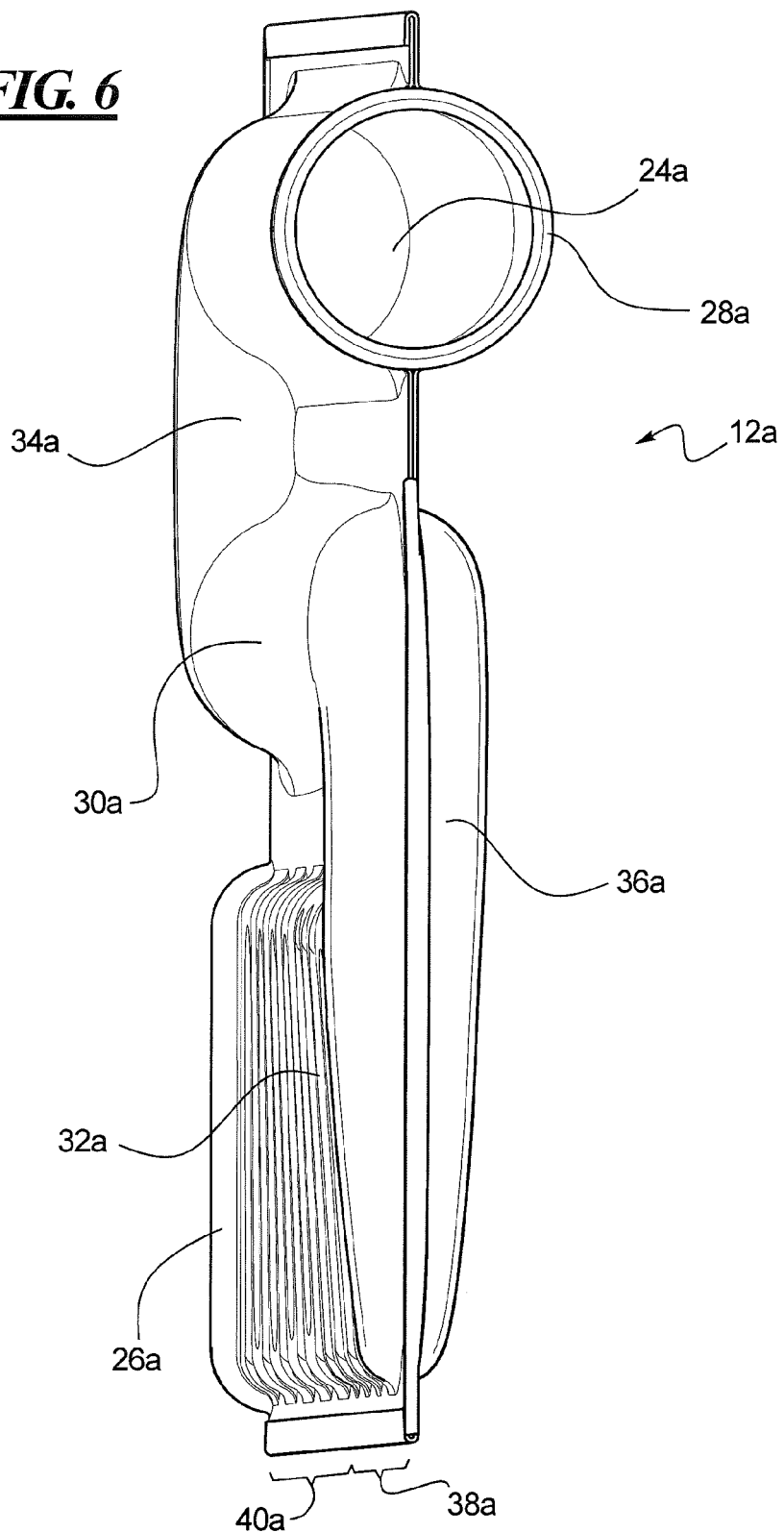

PRIMARY HEAT EXCHANGER DESIGN FOR CONDENSING GAS FURNACE

CROSS-REFERENCE TO RELATED APPLICATIONS

This is a non-provisional U.S. patent application, which claims priority under 35 U.S.C. §119(e) to U.S. Provisional Patent Application Ser. No. 61/296,505 filed on Jan. 20, 2010, the entirety of which is incorporated by reference herein.

FIELD OF THE DISCLOSURE

This disclosure relates to gas furnaces and, more particularly, to primary heat exchangers for condensing gas furnaces.

BACKGROUND OF THE DISCLOSURE

A typical gas furnace includes a flame or burner for heating flue gases, a primary heat exchanger for transferring heat from the heated gases to the circulate air, and a blower for circulating the circulate air through a home (or any surrounding area). The gas furnace often also includes an inducer for drawing out or otherwise venting the heated flue gases from the primary heat exchanger.

With respect to the primary heat exchanger in particular, it serves to transfer heat from the heated flue gases to the circulate air, while ensuring that the heated flue gases are never in contact with the circulate air. In order to obtain optimum efficiencies of operation of the gas furnace, it is generally necessary to maximize the heat transfer that occurs between the heated flue gases within the primary heat exchanger and the circulate air passing over the outer surfaces of the primary heat exchanger. However, several requirements and constraints must be taken into account when designing such a primary heat exchanger for achieving optimum performances.

One such consideration, for instance, pertains to reducing the height and/or overall size of the primary heat exchanger panels. By virtue of reducing the height of the primary heat exchanger, the overall height of the gas furnace can be reduced such that it can be placed in smaller (or compact) spaces, such as in attics, crawl spaces, closets, and the like. This further reduces the materials, as well the costs required to manufacture and build the primary heat exchangers, as well as the overall gas furnace cabinet.

Another consideration pertains to the aggregate pressure drop within the gas furnace. More specifically, the internal pressure drop within the primary heat exchanger panels must be maintained at acceptable levels so as to minimize the load, as well as the power consumed by the inducer, which in turn minimizes any added utility expenses to the consumer. Furthermore, minimizing the load on the inducer promotes the longevity of the inducer and the associated gas furnace.

Yet another consideration is the durability/longevity of the primary heat exchanger, which in turn can extend the life of the associated gas furnace. To promote longevity of the primary heat exchanger (and the associated gas furnace), the primary heat exchanger must be free of any excessive surface temperatures, or hotspots, and any thermal stresses must be minimized. This can generally be achieved by utilizing a high temperature material in the construction of the primary heat exchanger. However, such materials are typically expensive and can lead to higher manufacturing and other related costs.

Accordingly, there is a need for a primary heat exchanger for gas furnaces that is compact in size, costs less to manufacture, and promotes longer furnace life while optimizing performance. Moreover, there is a need for a compact primary heat exchanger that optimizes the overall length and surface area for providing more efficient transfer of heat. There is also need for a primary heat exchanger that would minimize the aggregate pressure drop through the primary heat exchanger and the coupling box so as to reduce the load on the inducer of the gas furnace.

SUMMARY OF THE DISCLOSURE

In at least some aspects of the present disclosure, a compact furnace heat exchanger for a gas furnace is disclosed. The compact furnace heat exchanger may include a first pass having an inlet end, a second pass in fluid communication with the first pass, and a third pass having an outlet end and in fluid communication with the second pass. The third pass may further include a plurality of irregularities, and the first pass, the second pass and the third pass may form a continuous flow passage.

In accordance with at least some other aspects of the present disclosure, another compact furnace heat exchanger is disclosed. The compact furnace heat exchanger may include a first pass having an inlet end, a second pass in fluid communication with the first pass through a first return bend, and a third pass in fluid communication with the second pass through a second return bend, the third pass having (a) a first section proximate to the second return bend, the first section may include a plurality of unidirectional irregularities; and (b) a second section disposed between the first section and an outlet end, the second section may include a plurality of bidirectional irregularities. Additionally, the first pass, the second pass and the third pass may form a continuous flow passage.

In accordance with yet other aspects of the present disclosure, a compact gas furnace is disclosed. The compact gas furnace may include a primary heat exchanger, a burner, a coupling box, a secondary heat exchanger, an inducer and a blower. The primary heat exchanger in particular may include a first pass with an inlet end, a second pass in fluid communication with the first pass through a first return bend, and a third pass with an outlet end. The third pass may be in fluid communication with the second pass through a second return bend and may include a plurality of irregularities. The burner may be disposed at the inlet end of the primary heat exchanger and the coupling box may be disposed at the outlet end of the primary heat exchanger, while the secondary heat exchanger may be coupled to the coupling box and the inducer may be coupled to the secondary heat exchanger and configured to form a vacuum to bias flue gases away from the burner. The blower may additionally be configured to circulate air across and over the primary heat exchanger.

Other advantages and features will be apparent from the following detailed description when read in conjunction with the attached drawings.

BRIEF DESCRIPTION OF THE DRAWINGS

For a more complete understanding of the disclosed disclosure, reference should be made to the embodiments illustrated in greater detail in the accompanying drawings, wherein:

FIGS. 4A-4C, where FIG. 4A shows a partial cross-sectional view of the primary heat exchanger of FIG. 3A along lines 4A-4A, and FIGS. 4B and 4C show cross-sectional views along lines 4B-4B and 4C-4C, respectively, of FIG. 3A;

FIG. 5 shows a cross-sectional view of the third pass of the primary heat exchanger along lines 5-5 of FIG. 3A; and FIG. 6 shows a perspective end view of the third pass of the primary heat exchanger of FIG. 2

It should be understood that the drawings are not necessarily to scale and that the disclosed embodiments are sometimes illustrated diagrammatically and in partial views. In certain instances, details which are not necessary for an understanding of the disclosure or which render other details difficult to perceive may have been omitted. It should be understood, of course, that this disclosure is not limited to the particular embodiments illustrated herein.

DETAILED DESCRIPTION OF THE DISCLOSURE

Figure 1:
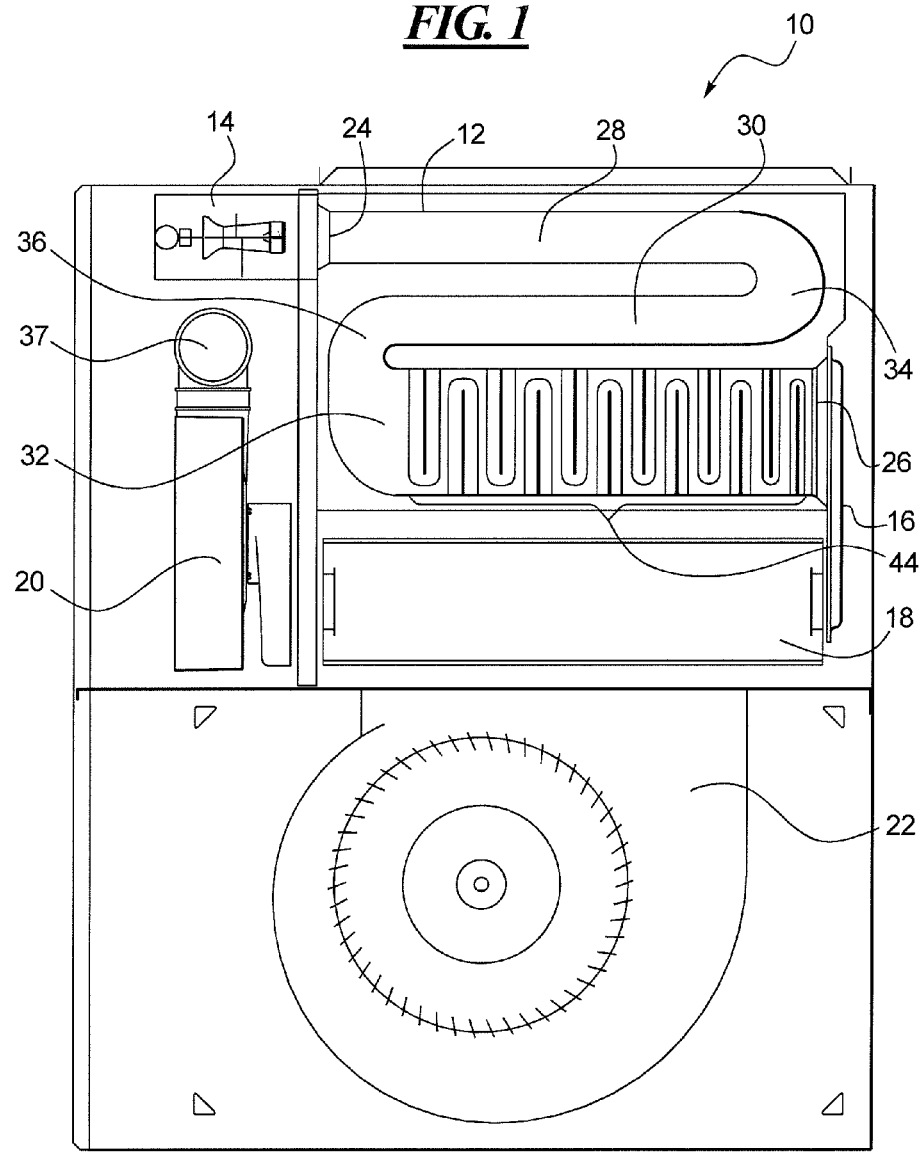
FIG. 1 shows a compact gas furnace employing a primary heat exchanger in accordance with at least some embodiments of the present disclosure.

Referring to FIG. 1, a compact condensing gas furnace 10 employing an exemplary primary heat exchanger 12 (also referred herein as a compact furnace heat exchanger) is shown, in accordance with at least some embodiments of the present disclosure. The gas furnace 10 can further include a burner 14 for combusting air and fuel to produce heated flue gases, a coupling box 16 for transferring the heated flue gases from the burner via the primary heat exchanger 12 to a secondary heat exchanger 18, an inducer 20 for drawing out or venting any exhausted flue gases, and a blower 22 for circulating circulate air in the surrounding areas.

Although only the primary heat exchanger 12, the burner 14, the coupling box 16, the secondary heat exchanger 18, and the inducer 20 have been shown in FIG. 1 in the gas furnace 10, it will be understood that several other commonly employed components, such as, humidifiers and filters, can additionally be used in conjunction or combination with the gas furnace in other embodiments of the present disclosure. It will also be understood that although the gas furnace 10 (and the primary heat exchanger 12) is shown in one orientation in FIG. 1, the orientation of the gas furnace (and the orientation of the primary heat exchanger along with the gas furnace) can vary depending upon the application.

With respect to the primary heat exchanger 12 in particular, in at least some embodiments, it is disposed between the burner 14 and the coupling box 16 for routing heated flue gases therebetween. More particularly, in some embodiments, the primary heat exchanger 12 can include an inlet end 24 disposed proximate to and in fluid communication with the burner 14 for receiving heated flue gases generated by the burner. The heated flue gases can then travel through the primary heat exchanger 12 to the coupling box 16 via an outlet end 26 disposed proximate to and in fluid communication with the coupling box.

In addition to being in fluid communication with the burner 14 and the coupling box 16, the inlet end 24 and the outlet end 26, respectively, of the primary heat exchanger 12 can also be in fluid communication with each other by way of a plurality of passageways or passes, such as, a first pass 28, a second pass 30 and a third pass 32. Each of the passes 28, and 32 can be interconnected by one or more return bends to form a continuous flow passage from the inlet end 24 to the outlet end 26. A first return bend 34 can interconnect the first pass 28 to the second pass 30 and a second return bend 36 can interconnect the second pass to the third pass 32.

In at least some embodiments, one or more of the passes 28, 30 and 32 can be formed as channels with the first and second return bends 34 and 36, respectively, being hair-pin/U-shaped (or substantially hair-pin/U-shaped) bends. By virtue of such a configuration of the passes 28, 30, 32 and the return bends 34, 36, the primary heat exchanger 12 can be configured to assume a compact configuration for maximizing the length and surface area thereof for optimum performance, while minimizing the overall height. In other embodiments, one or more of the passes 28, 30 and 32, as well as the first and second return bends 34 and 36, respectively, can assume configurations other than those described above.

Referring still to FIG. 1, in at least some embodiments, a vacuum formed by the inducer 20 can bias the flow of the heated flue gases away from the burner 14, through the inlet end 24 into the respective first, second and third passes 28, 30, 32 via the first and second bends 34, 36, respectively, and the outlet end 26, towards the coupling box 16 and the secondary heat exchanger 18. The flue gases can further be vented out of the gas furnace 10 by way of an exhaust or ventilation system (not shown) provided at an inducer output 37 of the inducer 20.

The blower 22 of the gas furnace 10 can serve to circulate air across and over surfaces of the primary heat exchanger 12 and into rooms or offices of a home, building, or any surrounding area. The outer surfaces of the primary heat exchanger 12 can be configured to transfer only the heat carried by the heated flue gases flowing therethrough into the circulate air flowing thereover while preventing the actual flue gases from mixing with the circulate air. In at least some other embodiments, other commonly used flow patterns of the flue gases can be employed.

Figure 2:
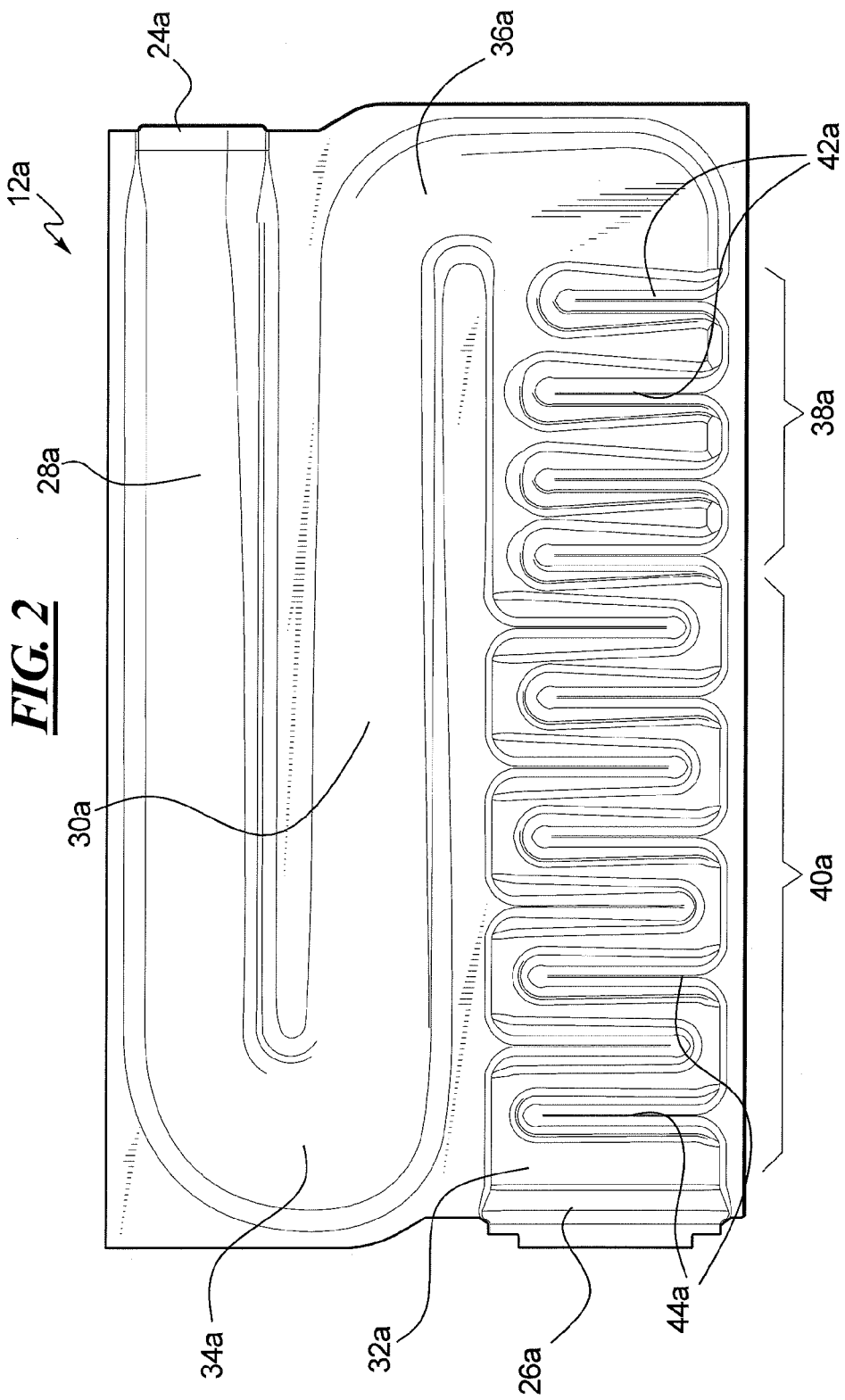
FIG. 2 shows a side plan view of an exemplary primary heat exchanger intended to be employed with the compact gas furnace of FIG. 1, the primary heat exchanger can include, among other components, a first pass, a second pass and a third pass, in accordance with at least some embodiments of the present disclosure.

Referring now to FIG. 2, another exemplary primary heat exchanger 12a employed within the gas furnace 10 (See FIG. 1) is shown in greater detail, in accordance with at least some embodiments of the present disclosure. Similar to the primary heat exchanger 12 of FIG. 1, the primary heat exchanger 12a can include an inlet end 24a configured to receive heated flue gases from the burner 14 (See FIG. 1) or other similar combusting source, and an outlet end 26a configured to vent exhausted flue gases into the inducer 20 (See FIG. 1), or the like, via the coupling box 16 (See FIG. 1) and the secondary heat exchanger 18 (See FIG. 1).

The primary heat exchanger 12a can further include a plurality of passageways or passes, such as, a first pass 28a, a second pass 30a and a third pass 32a that are defined by one or more return bends, such as, a first return bend 34a and a second return bend 36a. Similar to the first and second return bends 34 and 36, respectively, shown in FIG. 1, the return bends 34a and 36a can interconnect the passes 28a, 30a and 32a to form a continuous flow passageway through the primary heat exchanger 12a. In particular, the first pass 28a can be configured to lead heated flue gases from the burner 14 via the inlet end 24a through the first return bend 34a to the second pass 30a, which in turn can direct those gases via the second return bend 36a to the third pass 32a. The flue gases can then exit the primary heat exchanger 12a through the outlet end 26a of the third pass 32a.

The passes 28a, 30a, 32a and the return bends 34a, 36a of the primary heat exchanger 12a can be configured to be substantially compact in size without adversely affecting performance thereof. For example, the first and the second return bends 34a and 36a of the primary heat exchanger 12a can be configured with substantially sharp and/or narrow bends, as well as one or more corrugated sections disposed along one or more of the first, second and third pass 28a, 30a and 32a, respectively, for optimizing the performance of the primary heat exchanger 12a. In at least some embodiments, the third pass 32a of the primary heat exchanger 12a can be configured with a first corrugated section 38a and a second corrugated section 40a, each of which is described in greater detail below. In at least some other embodiments, the first and/or the second passes 28a and 30a, respectively, can be configured with corrugated sections similar to those described above.

Figure 3A:
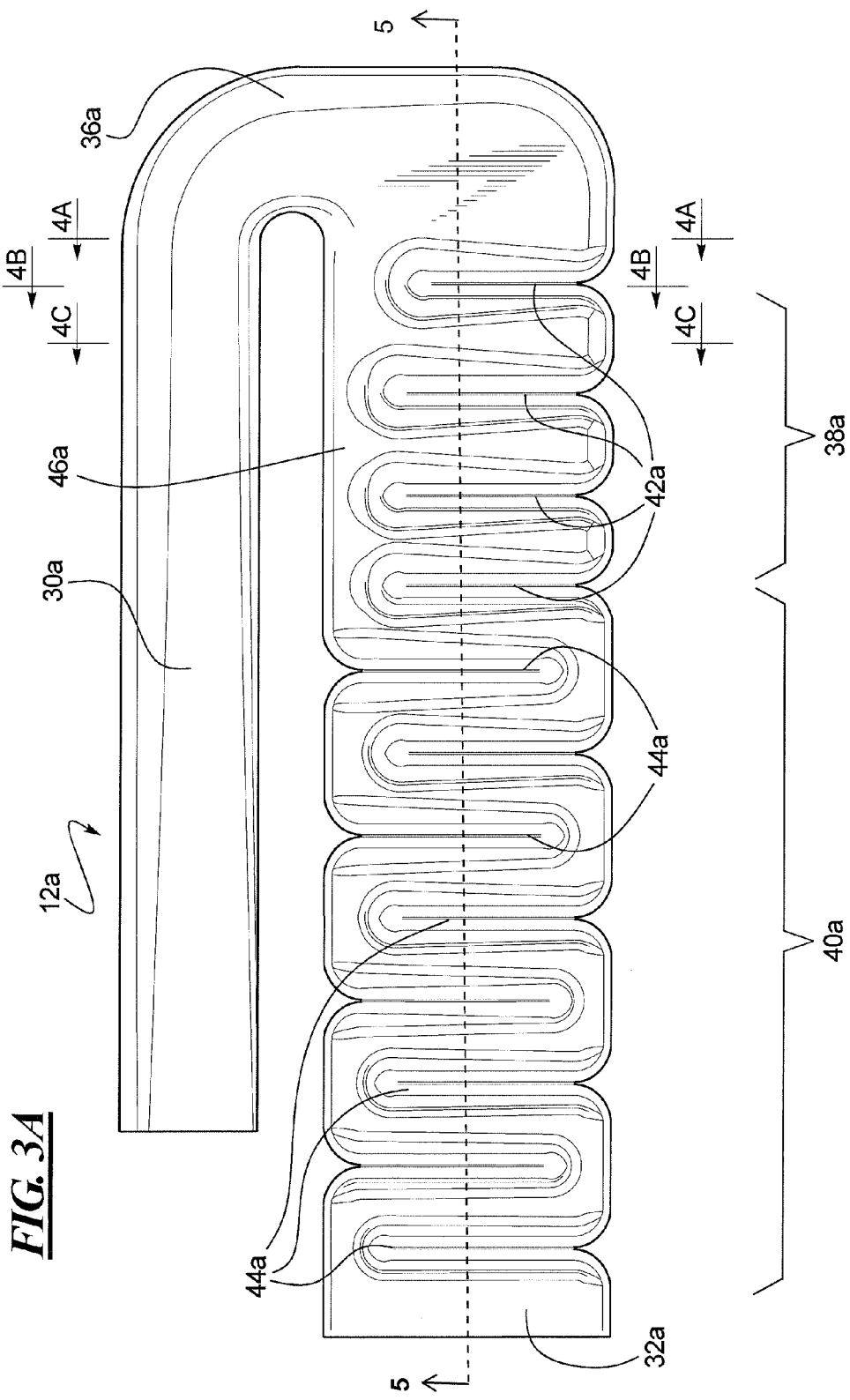
FIG. 3A shows a portion of the primary heat exchanger of FIG. 2, particularly, a first corrugated section and a second corrugated section of the third pass in greater detail.

Referring now to FIG. 3A, a portion of the primary heat exchanger 12a, particularly, the third pass 32a, is shown in greater detail in accordance with at least some embodiments of the present disclosure. As stated above, the third pass 32a of the primary heat exchanger 12a can include the first and second corrugated sections 38a and 40a, respectively, each of which can be configured to provide optimized resistance to the flow of heated flue gases entering the third pass and increase the overall efficiency of the primary heat exchanger (and the associated gas furnace 10). In particular, the first corrugated section 38a can include a plurality of vertically extending unidirectional irregularities (also called corrugations or "beads") 42a, and the second section 40a can include a plurality of vertically extending bidirectional irregularities (also called corrugations or "beads") 44a.

In at least some embodiments, the unidirectional and bidirectional irregularities 42a, 44a, respectively, can be laterally disposed along the length of the third pass 32a between the second return bend 36a and the outlet end 26a. Furthermore, each of the irregularities 42a and 44a can be configured to extend either in an upwardly (also called "up bead") or a downwardly (also called "down bead") direction from a bottom or a top surface/edge of the third pass 32a. For example, in at least some embodiments, each of the unidirectional irregularities 42a can be configured to extend partially upwardly from a lowermost surface/edge of the third pass 32a towards an upper surface/edge of the third pass 32a, thereby forming a plurality of "up beads". Similarly, the bidirectional irregularities 44a can be configured to alternate between a plurality of "up beads" and a plurality of "down beads," each of which can extend partially downwardly from a topmost surface/edge towards a lower surface/edge of the third pass 32a.

In at least some embodiments of the present disclosure, the unidirectional irregularities 42a can be configured to include four "up beads", while the bidirectional irregularities 44a can be configured to have a pattern of eight alternating "up beads" and "down beads" (four "up beads" and four "down beads"). By virtue of providing such a configuration of the unidirectional and bidirectional irregularities 42a and 44a, respectively, a zigzag (side-to-side) flow pattern for providing resistance to the flow of the heated flue gases through the core of the third pass 32a can be created, as described in greater detail with respect to FIG. 5.

Notwithstanding the fact that in the present embodiment, only four of the unidirectional irregularities 42a and eight of the bidirectional irregularities 44a have been shown, it will be understood that the number and pattern of the unidirectional and bidirectional irregularities can be varied depending upon the application of the primary heat exchanger 12a and the gas furnace 10 employing that primary heat exchanger. For example, in at least some other embodiments, the primary heat exchanger 12a can be configured with only the unidirectional irregularities 42a or only the bidirectional irregularities 44a. In yet other embodiments, the unidirectional irregularities 42a can also include "down beads," while in other embodiments, the bidirectional irregularities 44a can include only one of the "up beads" or "down beads."

Furthermore, the unidirectional irregularities 42a can typically be designed with an intentional common-end conduit 46a at the top end thereof for reducing the resistance of flow of the heated flue gases locally within the primary heat exchanger 12a near the entrance to the third pass 32a. The overall dimensions of the third pass 32a can also be configured so as to adapt to the flow patterns of the heated flue gases flowing therethrough, as described below. By virtue of adapting the third pass 32a, the cross-flow areas of different sections of the third pass can be increased or decreased to more evenly distribute the flow of flue gases through the primary heat exchanger 12a.

For example, the heated flue gases exiting the sharp turn of the second return bend 36a can tend to approach and accumulate more towards the lower portion of the third pass 32a than at an upper portion thereof. Such an accumulation of the heated flue gases can overheat the lower portion of the third pass 32a situated closest to the second return bend 36a, which can further result in an uneven and unwanted distribution of heat. In order to prevent at least some of this uneven distribution of the heated flue gases as they pass into the third pass 32a, the common-end conduit 46a of FIG. 3A disposed along the upper surface/edge of the first corrugated section 38a can serve to create a flow path of minimal resistance.

Figure 3B:
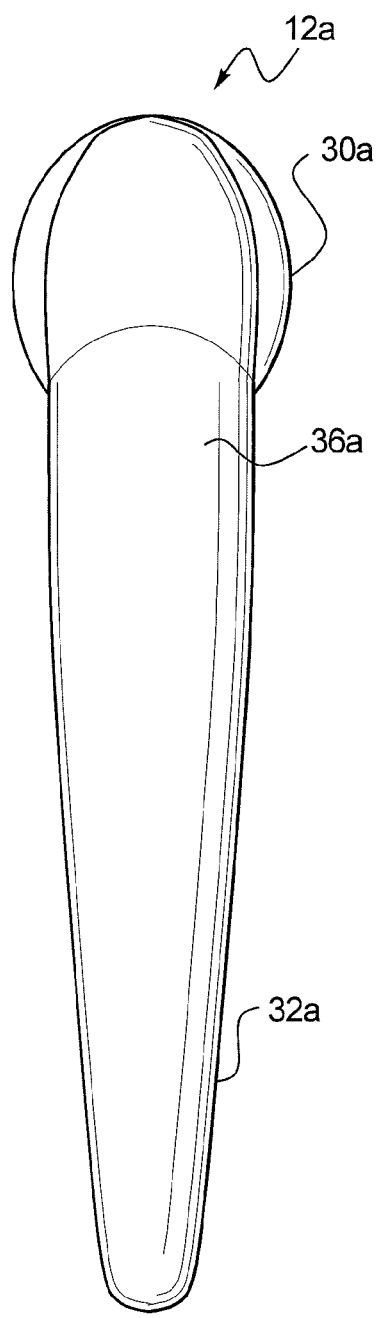
FIG. 3B shows an end view of the primary heat exchanger of FIG. 3A.

To further facilitate an even distribution of the heated flue gases, the general cross-section of the third pass 32a can also taper (longitudinally) from an upper portion to a lower portion of the third pass at an inlet thereof, as shown in FIG. 3B. By virtue of such a tapered configuration of the third pass 32a, the lateral cross-flow area of the lower portion of the third pass is reduced and the flow resistance of the lower portion relative to that of the upper portion of the third pass is increased. Such features can encourage the heated flue gases to take the path of least resistance, for example, along the upper portion of the third pass 32a, and thus, offset such uneven tendencies of gas flow while the heated flue gases exit the second return bend 36a.

Figure 4A:
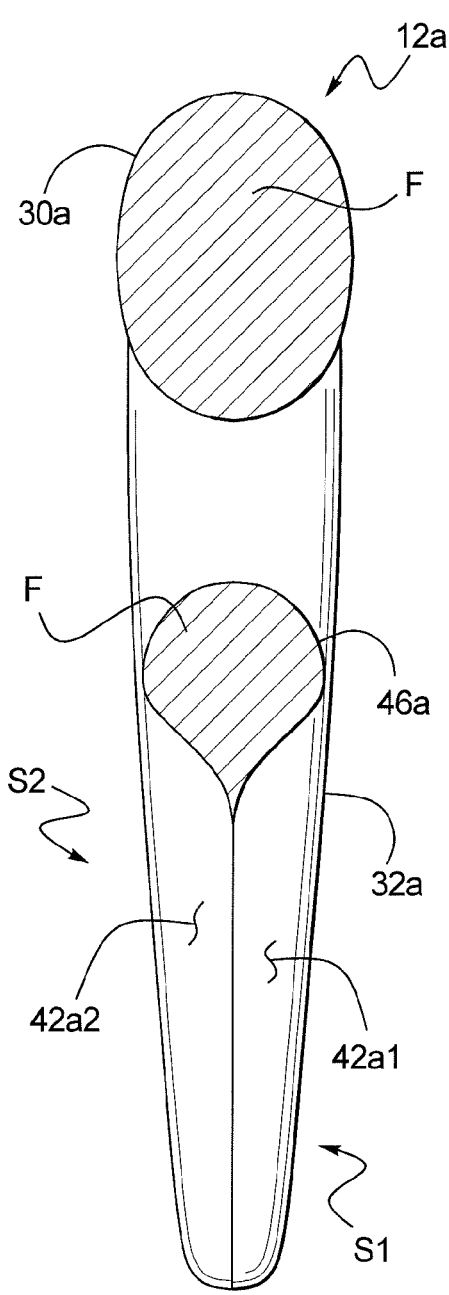

Turning now to FIGS. 4A-4C and referring to FIG. 4A in particular, a flow path F is shown. As shown, by virtue of the tapered cross-section of the third pass 32a, the flow path F through the common-end conduit 46a can be unrestricted while a path formed by unidirectional irregularities 42a1 and 42a2 disposed below the common-end conduit 46a can be relatively more restricted but not necessarily closed. For instance, as shown in the cross-sectional views of FIGS. 4B and 4C, which are taken along lines 4B-4B and 4C-4C of FIG. 3A, respectively, the respective unidirectional irregularities 42a1 and 42a2 disposed along opposing sides S1, S2 of the third pass 32a can be shifted or offset with respect to one another so as to alternate the flow path F therethrough and cause some resistance.

Moreover, each irregularity 42a1 disposed on the first side 51 of the third pass 32a can be configured to be longitudinally shifted, for example, offset by approximately half the width thereof, with respect to the opposing irregularity 42a2 disposed on the second side S2 of the third pass 32a, thereby creating the zigzag pattern mentioned above and described in greater detail below. Accordingly, the heated flue gases exiting the second pass 30a can be allowed to flow through and between the irregularities 42a1, 42a2, but with added resistance as compared to that of the common-end conduit 46a.

Referring now to FIG. 5, a lengthwise cross-sectional view of the third pass 32a taken along line 5-5 of FIG. 3A is shown, in accordance with at least some embodiments of the present disclosure. As shown, the unidirectional and bidirectional irregularities 42a and 44a, respectively, which are disposed along the walls of the third pass 32a can form an alternating or a zigzag flow path (e.g., the flow path F) through which the heated flue gases can flow. In addition to providing optimized resistance to the flow of the heated flue gases, the zigzag pathway (the flow path F), in certain orientations, can also provide a circuitous flow path for any condensation or water that may have formed or migrated therein to flow from the outlet end 26a to the inlet end 24a of the primary heat exchanger 12a.

As also shown by the lengthwise cross-sectional view of FIG. 5, in at least some embodiments, the depth or thickness of the flow path F can gradually narrow while the overall lengthwise cross-section of the third pass 32a can additionally taper from the second return bend 36a to the outlet end 26a. In particular, the lateral cross-flow area of the third pass 32a can be gradually reduced as the third pass 32a extends away from the second return bend 36a so as to accommodate for any reduction in gas flow as the heated flue gases travel away from the second return bend 36a and approach the outlet 26a, as well as to provide increased resistance to the flow of gases.

The lengthwise spacing between the individual irregularities 42a, 44a can also be gradually varied so as to increasingly constrict the cross-flow area from the second return bend 36a to the outlet 26a of the third pass 32a. For instance, the spacing between the unidirectional irregularities 42a can gradually shorten while moving away from the second return bend 36a, as shown in FIGS. 3A and 5. Corresponding spacing between the bidirectional irregularities 44a can similarly be reduced, or alternatively, kept constant for the length of the second section 40a.

Furthermore, depending on the desired application, one or more of the individual irregularities 42a, 44a can also be tapered so as to provide more flow resistance toward the lower portion of the third pass 32a, as shown in greater detail in FIG. 4B above. In particular, as shown in FIG. 4B, the unidirectional bead 42a1 tapers from a mid plane 52 (pointed out generally along a centerline 54 of the primary heat exchanger) of the primary heat exchanger 12a to outward away therefrom. Notwithstanding the fact that in the present embodiment, the taper has been shown with respect to the unidirectional bead 42a1, in other embodiments, the bead taper can be present or otherwise formed in the bidirectional beads 44a as well. Further, the bead taper need not be present in every bead within the third pass 32a. In some embodiments, only certain of the beads may incorporate the aforementioned taper.

Referring now to FIG. 6, a perspective end view of the third pass 32a is shown in accordance with at least some embodiments of the present disclosure. As shown, the degree of the lengthwise cross-sectional taper across the upper portion of the third pass 32a can be configured to be different than that of the lower portion of the third pass 32a. For instance, the lengthwise cross-section of the lowermost portion of the third pass 32a may not incorporate a taper and be of constant thickness throughout its length, while the lengthwise cross-section of the uppermost portion of the third pass 32a can incorporate a maximum taper configurable for optimum efficiency. Thus, the degree of the taper of the lengthwise cross-section of the third pass 32a may be gradually increased from the lowermost portion to the uppermost portion thereof. Such lateral and/or lengthwise taper accords the entire third pass 32a with a 2-dimensional taper, thereby resulting in a non-uniform thickness.

For example, in at least some embodiments, the outlet end 26a of the third pass 32a can be uniform in width (for example, approximately one half an inch wide), while the width of the bottom edge extending from the outlet end to the entrance of the third pass can be nominally held constant (for example, approximately one half an inch wide). Along the top portion of the third pass 32a, the width can taper from the outlet end 26a towards the entrance of the third pass from approximately one half an inch wide to about one inch wide. As will be understood, this can create an inverted "tear-drop" shape at the entrance of the third pass 32a, thereby affording a lower resistance to the flow at the top of the taper where the cross flow area is greater than at the bottom of the taper where the cross flow area is lesser. By virtue of such a taper, the bulk of the flow of the heated flue gases may stay towards the top of the third pass 32a and prevent overheating of the first few unidirectional irregularities 42a. It will be understood that the dimensions mentioned above are merely exemplary and can vary in other embodiments of the present disclosure.

As further shown in FIG. 6, the proximal first section 38a of the third pass 32a may be substantially more tapered and thicker than the distal second section 40a of the third pass 32a. The sections of the third pass 32a disposed closest to the outlet 26a, as well as the outlet 26a itself, may be uniform in width or thickness. As additionally shown in FIG. 3A above, the depth or thickness of the third pass 32a can gradually narrow and the overall lengthwise cross-section of the third pass can taper from the second return bend 36a to an outlet end 26a. In particular, the lateral cross-flow area of the third pass 32a may be gradually reduced as the third pass 32a extends away from the second return bend 36a so as to accommodate for any reduction in flow as flue gases travel away from the second return bend 36a and approach the outlet end 26a. Further, in at least some embodiments, the depth of the unidirectional and bidirectional irregularities 42a and 44a, respectively, can be set to approximately half of the cross-sectional thickness of the primary heat exchanger 12a. In other embodiments, depths other than those specified above can be employed.

Further, the unidirectional irregularities 42a may also include a first shortened irregularity 50 so as to further encourage flow through the upper portion of the third pass 32a as the heated flue gases exit the second return bend 36a. The first section 38a of unidirectional irregularities 42a can also be configured such that the spacing between the individual irregularities 42a is gradually decreased, as shown in FIG. 3A. Depending on the desired application, one or more of the individual irregularities 42a, 44a can also be tapered so as to provide more flow resistance toward the lower portion of the third pass 32a. In at least some embodiments, the heights of the first and second (those closest to the entrance of the third pass 32a) of the unidirectional irregularities 42a can further be changed to prevent local high temperatures spots on the lower part of those irregularities. In other embodiments, depending upon the application, other configurations can be employed.

INDUSTRIAL APPLICABILITY

From the foregoing, it can be seen that the present disclosure has applicability in the manufacture of heat exchangers, gas furnaces, and the like. By appropriately configuring the passes (the first, second and the third passes 28/28a, 30/30a, 32/32a, respectively) of the primary heat exchanger 12 and 12a, the height of the primary heat exchanger can be minimized (in some cases significantly minimized). Moreover, through the use of lateral irregularities, resistance to the flow of flue gases therethrough can be optimized for increased efficiency, and hotspots caused by uneven flow can be minimized, thereby avoiding the need to use more expensive high temperature materials in the construction of the primary heat exchanger 12 and 12a.

Additionally, by virtue of the aforementioned design features of the primary heat exchanger 12 and 12a, the aggregate pressure drop in the gas furnace 10 (for example, pressure drop through the primary heat exchanger, the coupling box 16 and the secondary heat exchanger 18) can be reduced, thereby reducing the power needed by the inducer 20 to handle the exhausted heated flue gases.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A compact furnace heat exchanger, comprising
 a first pass having an inlet end;
 a second pass in fluid communication with the first pass; and
 a third pass having an outlet end; the third pass in fluid communication with the second pass and having a plurality of irregularities, and the first pass, the second pass and the third pass forming a continious flow passage, the plurality of irregularities including at least one up bead extending partially upwardly from a lower surface/edge of the third pass towards an upper surface/edge of the third pass and at least one down bead extending partially downwardly from the upper surface/edge towards the lower surface/edge of the third pass.

2. The compact furnace heat exchanger of claim 1 further comprising:
 a first return bend fluidly interconnecting the first pass to the second pass; and
 a second return bend fluidly interconnecting the second pass to the third pass to form the continuous flow passage and the first pass, the second pass and the third pass are disposed within a common plane of the compact furnace heat exchanger.

3. The compact furnace heat exchanger of claim 1, wherein the third pass includes a first section having a plurality of the at least one up bead and a second section having a plurality of the at least one up bead and a plurality of the at least one down bead.

4. The compact furnace heat exchanger of claim 3, wherein the first section includes four up beads.

5. The compact furnace heat exchanger of claim 3, wherein the at least one up bead in the first section forms a common-end conduit towards an upper portion of the third pass to create a flow path of minimal resistance and facilitate even distribution of heated flue gases from the second pass into the third pass.

6. The compact furnace heat exchanger of claim 3, wherein at least one of the at least one up bead in the first section is smaller in height than subsequent of the at least one bead in the first section.

7. The compact furnace heat exchanger of claim 3, wherein (a) spacing between each of the plurality of the at least one up bead in the first section progressively decreases towards the outlet end of the third pass; and (b) the thickness or depth of the plurality of the at least one up bead in the first section progressively decreases towards the outlet end of the third pass.

8. The compact furnace heat exchanger of claim 3, wherein the second section includes an alternating pattern of four up beads and four down beads.

9. The compact furnace heat exchanger of claim 3, wherein the thickness or depth of each of the plurality of the at least one up bead and the plurality of the at least one down bead in the second section remains constant.

10. The compact furnace heat exchanger of claim 1, wherein the plurality of irregularities form a zigzag flow path within the third pass to increase resistance for the flow of heated flue gases entering the third pass from the second pass.

11. The compact furnace heat exchanger of claim 1, wherein the third pass has a generally tapered lateral cross-section tapering towards the outlet end.

12. The compact furnace heat exchanger of claim 1, wherein the third pass has a generally tapered lengthwise cross-section.

13. The compact furnace heat exchanger of claim 1, wherein the depths of the plurality of irregularities are approximately half of the thickness of the compact furnace heat exchanger.

14. The compact furnace heat exchanger of claim 1, wherein one or more of the plurality of irregularities are individually tapered.

15. A compact gas furnace, comprising:
 a primary heat exchanger having a first pass, the first pass having an inlet end, a second pass in fluid communication with the first pass through a first return bend, and a third pass having an outlet end, the third pass in fluid communication with the second pass through a second return bend, the third pass further having a plurality of irregularities, the plurality of irregularities including at least one up bead extending partially upwardly from a lower surface/edge of the third pass towards an upper surface/edge of the third pass and at least one down bead extending partially downwardly from the upper surface/edge towards the lower surface/edge of the third pass;
 a burner disposed at the inlet end of the primary heat exchanger;
 a coupling box disposed at the outlet end of the primary heat exchanger;
 a secondary heat exchanger coupled to the coupling box;
 an inducer coupled to the secondary heat exchanger and configured to form a vacuum to bias flue gases away from the burner; and
 a blower configured to circulate air across and over the primary heat exchanger.

16. A compact furnace heat exchanger, comprising:
 a first pass having an inlet end;
 a second pass in fluid communication with the first pass through a first return bend;
 a third pass in fluid communication with the second pass through a second return bend such that the first pass, the second pass and the third pass form a continuous flow passage; the third pass further having a first section proximate to the second return bend and including a plurality of unidirectional irregularities and a second section disposed between the first section and an outlet end and including a plurality of bidirectional irregularities, the unidirectional irregularities including up beads extending partially upwardly from a lower surface/edge of the third pass towards an upper surface/edge of the third pass and the bidirectional irregularities including the up beads and down beads extending partially downwardly from the upper surface/edge towards the lower surface/edge of the third pass.

17. The compact furnace heat exchanger of claim 16, wherein (a) the unidirectional irregularities form a common-end conduit extending through the first section; (b) the third pass has a tapered cross section tapering from a top portion of the third pass to a bottom portion of the third pass at an inlet thereof; and (c) the third pass has a tapered cross section tapering from the second return bend towards the outlet end.

18. The compact furnace heat exchanger of claim 16, wherein a lengthwise spacing between the plurality of unidirectional irregularities in the first section is gradually shortened from the second return bend towards the outlet end.

19. The compact furnace heat exchanger of claim 16, wherein a lengthwise spacing between the plurality of bidirectional irregularities in the second section is gradually shortened moving towards the outlet end.

20. The compact furnace heat exchanger of claim 16, wherein a lengthwise spacing between the plurality of bidirectional irregularities in the second section is kept constant moving towards the outlet end.

\* \* \* \* \*